United States Patent
Pamplin (10) Patent No.: US 12,349,841 B1
(45) Date of Patent: Jul. 8, 2025

(54) BLENDER WITH LID DETECTION AND OVERRIDE

(71) Applicant: MavorCo Operations LLC, New York, NY (US)

(72) Inventor: Ryan Michael Pamplin, San Juan, PR (US)

(73) Assignee: MavorCo Operations LLC, New York, NY (US)

( * ) Notice: Subject to any disclaimer, the term of this patent is extended or adjusted under 35 U.S.C. 154(b) by 661 days.

(21) Appl. No.: 17/549,547

(22) Filed: Dec. 13, 2021

(51) Int. Cl.
  *A47J 43/07* (2006.01)
  *A47J 31/00* (2006.01)
  *A47J 43/046* (2006.01)

(52) U.S. Cl.
  CPC ......... *A47J 43/0777* (2013.01); *A47J 31/005* (2013.01); *A47J 43/046* (2013.01)

(58) Field of Classification Search
  CPC ........ A47J 43/046; A47J 43/07; A47J 43/075; A47J 43/0761; A47J 43/0777
  See application file for complete search history.

(56) References Cited

U.S. PATENT DOCUMENTS

| | | | |
|---|---|---|---|
| 3,881,705 A | 5/1975 | Greenspan | |
| 6,609,821 B2 | 8/2003 | Wulf | |
| 9,839,326 B2 | 12/2017 | Sapire | |
| 10,383,482 B1 | 8/2019 | Pamplin | |
| 10,702,837 B1 | 7/2020 | Pamplin | |
| 10,828,612 B1 | 11/2020 | Pamplin | |
| 11,213,170 B2 | 1/2022 | Widanagamage Don | |
| 2006/0153003 A1 | 7/2006 | Sands | |
| 2011/0248108 A1* | 10/2011 | Carriere | A47J 43/0772 241/37.5 |
| 2016/0095469 A1 | 4/2016 | Gregory | |
| 2017/0246604 A1 | 8/2017 | Sollazzo Lee | |
| 2020/0275807 A1* | 9/2020 | Kolar | A47J 43/046 |
| 2023/0157484 A1 | 5/2023 | Bradley | |

* cited by examiner

*Primary Examiner* — Elizabeth Insler (74) *Attorney, Agent, or Firm* — Esplin & Associates, PC (57) ABSTRACT

A blender with a touchscreen interface is provided to control different blending modes of operation. Exemplary implementations may: receive, by the touchscreen that is included in a control interface of the blender, a first type of user input and a second type of user input; obtain output signals generated by sensors; make detections regarding the user input received by the control interface of the blender; effectuate a transition from a ready-to-blend mode to a first blending mode based on the detections and obtained output signals; control an electrical motor during the ready-to-blend mode such that the blender is not blending; and control an electrical motor during the first blending mode such that the blender is blending.

20 Claims, 5 Drawing Sheets

BLENDER WITH LID DETECTION AND OVERRIDE

FIELD OF THE DISCLOSURE

The present disclosure relates to blenders with lid detection and override, particularly portable blenders.

BACKGROUND

Blenders are known, typically as consumer-grade home appliances. Detection mechanisms are known, e.g., using sensors, and/or other mechanisms of detection.

SUMMARY

One aspect of the present disclosure relates to a blender configured to blend foodstuffs using different (blending) modes of operation. A user may control transitions between different modes of operation through a touchscreen interface. In some implementations, the blender may present the user with a notification and/or prevent the blender from blending, responsive to a lid not being properly attached to the blender. A user may control whether the notification is presented, responsive to the lid not being properly attached to the blender. In some implementations, the user may provide specific user input to override the notification and/or the prevention of blending. In some implementations, the blender may be portable due to its size, and/or its rechargeability. By virtue of true portability, a user can take the blender anywhere and create drinks, shakes, smoothies, baby food, sauces, and/or other concoctions. Once the blender is fully charged, a user can prepare multiple servings quickly and easily. In some implementations, lack of an external power source, much less a reliable external power source, is no longer preventing users from enjoying blended drinks. By virtue of the control interface and corresponding control circuitry described in this disclosure, different blending modes of operation, selection of notifications, overriding notifications, and/or other features may be available through an easy-to-use control interface. In some implementations, the control interface may include a (round) touchscreen that is configured to receive user input.

The blender may include a blending component, a base assembly, a container assembly, a lid assembly, a control interface, control circuitry, and/or other components. As used herein, the term "foodstuffs" may include ingredients ranging from solid to liquid, from hot to cold or frozen, in any combination. As used herein, the term "ingredient" merely connotes something fit to ingest, and not necessarily nutritional value. For example, ice and/or ice cubes may be ingredients.

One aspect of the present disclosure relates to a method for transitioning from a ready-to-blend mode to a first blending mode of a blender configured to blend foodstuffs. The blender may include one or more of a base assembly, a container assembly, a lid assembly, a blending component, a control interface, control circuitry, and one or more sensors. The method may comprise receiving, by a touchscreen that is included in the control interface of the blender, a first type of user input and a second type of user input. The first type of user input may indicate the user touching the touchscreen in a first manner and the second type of user input may indicate the user touching the touchscreen in a second manner. The method may comprise obtaining output signals generated by the one or more sensors. The output signals may include sensor information representing at least one of a first lid status and a second lid status. The first lid status may indicate that the lid assembly is coupled with the container assembly. The second lid status may indicate the lid assembly is not coupled with the container assembly. The method may comprise making detections regarding the user input received by the control interface. The detections may include a first type of detections and a second type of detections. The first type of detections may indicate occurrences of the control interface receiving the first type of user input. The first type of user input may indicate the user selecting the first blending mode. The second type of detections may indicate occurrences of the control interface receiving the second type of user input. The second type of user input may indicate the user selecting a first setting or a second setting from the settings menu. The first setting may be associated with effectuating a notification to the user responsive to the lid assembly not being coupled with the container assembly. The selection of the second setting may be associated with preventing notifications responsive to the lid assembly not being coupled with the container assembly. The method may comprise, responsive to a first detection of the first type of detections occurring and a second detection of the second type of detections indicating the user has selected the first setting from the settings menu, and (i) further responsive to the sensor information representing the first lid status, effectuating a transition from the ready-to-blend mode to the first blending mode, and (ii) further responsive to the sensor information representing the second lid status, effectuating the notification to the user via the touchscreen and preventing transition from the ready-to-blend mode to the first blending mode. The method may comprise, responsive to the first detection of the first type of detections and a third detection of the second type of detections, wherein the third detection indicates the user has selected the second setting from the settings menu, effectuating a transition from the ready-to-blend mode to the first blending mode regardless of the sensor information. The method may comprise, during the ready-to-blend mode, controlling an electrical motor included in the base assembly of the blender such that the blender is not blending. The method may comprise, during the first blending mode, controlling the electrical motor of the blender such that the blender is blending.

As used herein, any association (or relation, or reflection, or indication, or correspondency) involving assemblies, lids, blending components, blades, motors, rotational axes, longitudinal axes, diameters, batteries, couplings, interfaces, touchscreens, detectors, sensors, indicators, magnetic components, caps, rotations, and/or another entity or object that interacts with any part of the blender and/or plays a part in the operation of the blender, may be a one-to-one association, a one-to-many association, a many-to-one association, and/or a many-to-many association or "N"-to-"M" association (note that "N" and "M" may be different numbers greater than 1).

As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
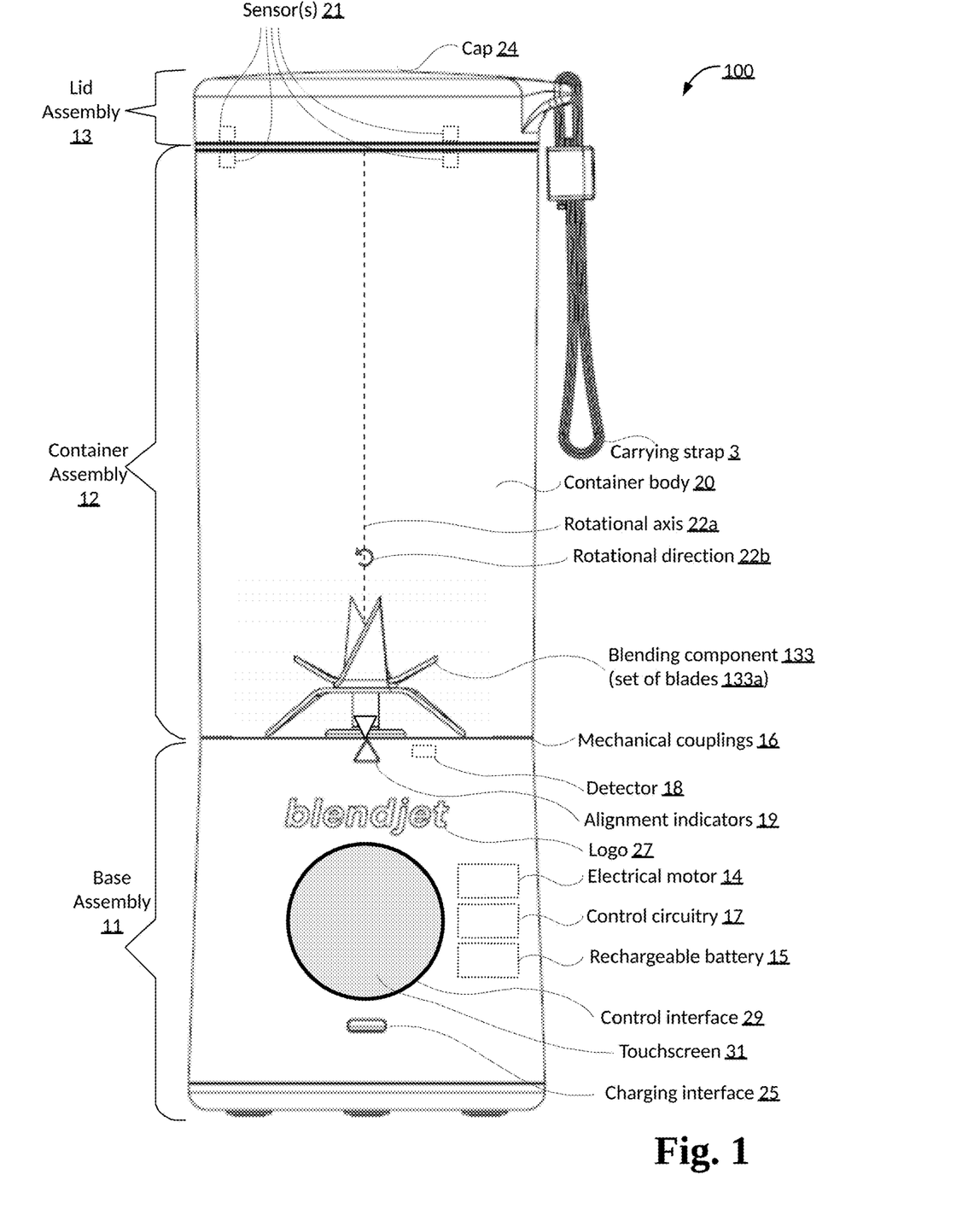
FIG. 1 shows a front view of a blender configured to blend foodstuffs using different (blending) modes of operation, in accordance with one or more implementations.

FIG. 1 shows a blender 100 configured to blend foodstuffs using different blending modes of operation, in accordance with one or more implementations. Blender 100 may include one or more of a base assembly 11, a container assembly 12, a lid assembly 13, a blending component 133, a control interface 29, control circuitry 17 (depicted in FIG. 1 as a dotted rectangle to indicate this component may be embedded within base assembly 11, and not readily visible from the outside), and/or other components. Control interface 29 may include one or more of a touchscreen 31 and/or other components. Container assembly 12 may include one or more of a container body 20, a proximal end 5 (shown in FIG. 4 as the end of container assembly 12 that is closest to base assembly 11), a distal end 7 (shown in FIG. 4 as the end of container assembly 12 that is furthest from base assembly 11), and/or other components. Lid assembly 13 may include one or more of a cap 24 (or a lid, e.g., to prevent spilling during blending), a carrying strap 3 (e.g., configured to carry blender 100), and/or other components. Lid assembly 13 may be configured to be coupled with container assembly 12 near distal end 7 of container assembly 12 (shown in FIG. 4). In some implementations, lid assembly 13 may be configured to couple with container assembly 12 using a snapping mechanism, a screw mechanism (e.g., grooves positioned on lid assembly 13 and/or container assembly 12), one or more threaded couplings, and/or other mechanisms of attachment. In some implementations, lid assembly 13 and container assembly 12 may be coupled using a leak-proof mechanism of attachment.

Base assembly 11 and container assembly 12 may be configured to be coupled during blending by blender 100. For example, in some implementations, base assembly 11 and container assembly 12 may be mechanically coupled, e.g., through one or more threaded couplings. Other types of couplings may be envisioned for blender 100, though leak-proof options are preferred, since most uses include one or more liquid ingredients. In some implementations, control circuitry 17 and/or other components may be included in base assembly 11, e.g., within base assembly 11. For example, one or more of control interface 29, control circuitry 17, electrical motor 14 (depicted in FIG. 1 as a dotted rectangle to indicate this component may be embedded within base assembly 11, and not readily visible from the outside), rechargeable battery 15 (depicted in FIG. 1 as a dotted rectangle to indicate this component may be embedded within base assembly 11, and not readily visible from the outside), and/or other components may be integrated permanently into base assembly 11 such that base assembly 11 forms an integral whole. In some implementations, the phrase "integrated permanently" may refer to components being integrated such that they are not readily accessible, serviceable, and/or replaceable by a user, or at least not during ordinary usage by the user, including, but not limited to, charging, blending, cleaning, and storing for later use. In some implementations, base assembly 11, container assembly 12, lid assembly 13, and/or other components may include one or more sensor(s) 21 (depicted in FIG. 1 as dotted squares to indicate these components may be embedded within container assembly 12 and/or lid assembly 13, and readily visible from the outside).

Figure 5:
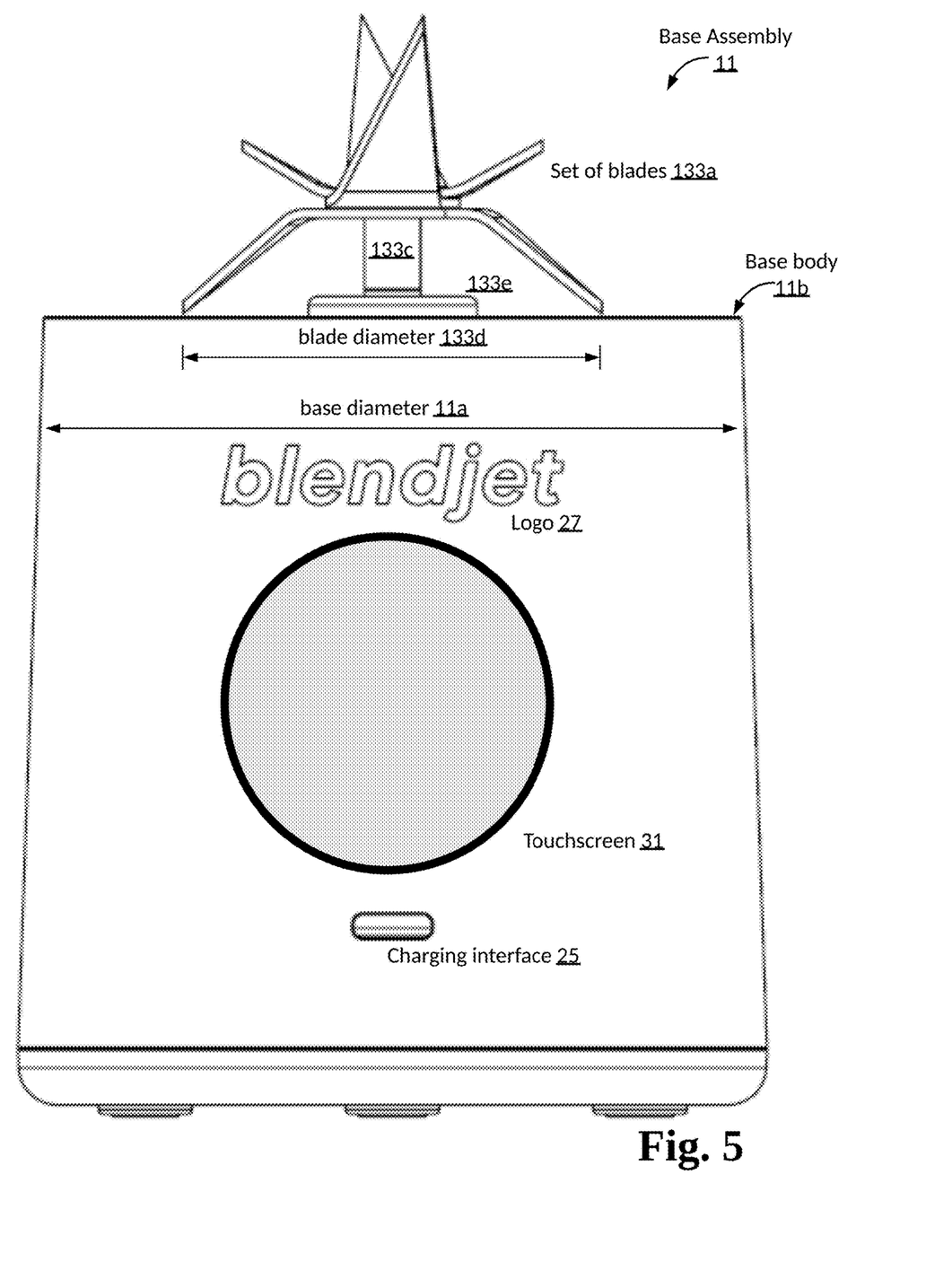
FIG. 5 shows a front view of a base assembly of a blender configured to blend foodstuffs using different (blending) modes of operation, in accordance with one or more implementations.

In some implementations, base assembly 11 may include one or more of a base body 11b (as depicted in FIG. 5, containing at least some of the components of base assembly 11), electrical motor 14, a rechargeable battery 15, a charging interface 25, one or more mechanical couplings 16, a detector 18 (depicted in FIG. 1 as a dotted rectangle to indicate this component may be embedded within base assembly 11, and not readily visible from the outside), one or more alignment indicators 19, control interface 29, and/or other components.

In some implementations, blending component 133 (e.g., a set of blades 133a, also referred to as a set of one or more blades 133a) may be mounted to base assembly 11 and/or proximal end 5 of container assembly 12 may be open and disposed, subsequent to container assembly 12 not being coupled with the base assembly 11. In some implementations, proximal end 5 of container assembly 12 may not be opened and disposed and/or blending component 133 may be mounted to proximal end 5 of container assembly 12, such that blending component 133 is positioned within container body 20. Responsive to blending component 133 being mounted to container assembly 12, electrical motor 14 may rotate blending component 133 subsequent to base assembly 11 being coupled to container assembly 12 near proximal end 5 using one or more mechanical couplings 16 and/or other components.

In some implementations, one or more mechanical couplings 16 may include threaded couplings. For example, one or more mechanical couplings 16 may include a first mechanical coupling and a second mechanical coupling. In some implementations, the first mechanical coupling may be included in base assembly 11 and may be a female threaded coupling configured to fit together with the second mechanical coupling (which may be included in container assembly 12). The first mechanical coupling and the second mechanical coupling may be configured to (temporarily and detachably) couple base assembly 11 to container assembly 12.

Referring to FIG. 1, blending component 133 may include one or more structural components configured to blend foodstuffs, including but not limited to one or more blending bars, one or more blades, and/or other structural components configured to rotate. For example, in some implementations, blending component 133 may include set of blades 133a, which may be rotatably mounted to base assembly 11 to blend foodstuffs. Blending component 133 may be configured to rotate around a rotational axis 22a. Rotational axis 22a is depicted in FIG. 1 as a geometric (two-dimensional) line extending indefinitely through blending component 133 and is not a physical axis. Rather, rotational axis 22a indicates how blending component 133 rotates in relation to other components of blender 100, in a rotational direction 22b. In some implementations, blending component 133 may be mounted permanently to base assembly 11, proximal end 5 of container assembly 12, and/or other components of blender 100. In some implementations, set of blades 133a may include 1, 2, 3, 4, 5, or more pairs of blades. In some implementations, a pair of blades may include two blades on opposite sides of rotational axis 22a. In some implementations, a pair of blades may have two blades such that the distal ends of these two blades are at the same horizontal level. In some implementations, as depicted in the upright configuration of blender 100 in FIG. 1, set of blades 133a may include six blades that form three pairs of blades. In some implementations, set of blades 133a may include at least two downward blades, which may prevent and/or reduce foodstuffs remaining unblended when disposed under the upward blades. In some implementations, set of blades 133a may include at least four upward blades. In some implementations, including six blades may be preferred over including less than six blades, in particular for blending ice and/or ice cubes. By using more blades, more points of contact will hit the ice at substantially the same time, which reduces the likelihood that a piece of ice is merely propelled rather than broken, crushed, and/or blended, in particular for implementations having limited power (here, the term limited is used in comparison to blenders that are connected to common outlets during blending), such as disclosed herein. As used herein, directional terms such as upward, downward, left, right, front, back, and so forth are relative to FIG. 1 unless otherwise noted.

Referring to FIG. 1, in some implementations, base assembly 11 may have a cylindrical and/or conical shape (apart from blending component 133 and/or set of blades 133a). In some implementations, the shape of base assembly 11 may have a base diameter between 2 and 4 inches. In some implementations, the shape of base assembly 11 may have a base diameter between 3 and 3.5 inches. Such a base diameter may improve portability, as well as allow blender 100 to be stored in a cup holder, e.g., in a vehicle. For example, FIG. 5 shows a front view of base assembly 11, depicting a blade diameter 133d (e.g., the diameter of the circle described by rotation of the distal ends of the lowest (and/or widest) pair of blades in set of blades 133a) and a base diameter 11a (as measured at or near the top of base assembly 11). In some implementations, blade diameter 133d may refer to the largest diameter of any circle described by rotation of distal ends of pairs of blades in set of blades 133a (or other distal ends of blending component 133), as measured perpendicular to rotation. In some implementations, the orientation of blade diameter 133d may be orthogonal/perpendicular to the direction of rotational axis 22a. In some implementations, the plane of rotation of the distal ends of the blades (or other distal ends of blending component 133) that define blade diameter 133d may be orthogonal/perpendicular to the direction of rotational axis 22a. Blade diameter 133d may refer to a blending bar, or to set of blades 133a, and/or to other types of blending components.

Referring to FIG. 1, lid assembly 13 may include cap 24 that is configured to prevent spilling of liquids and/or other foodstuffs, responsive to lid assembly 13 being coupled with container assembly 12. In some implementations, lid assembly 13 may couple with container assembly 12 using one or more leak-proof attachment mechanisms including a snap mechanism, a screw mechanism, and/or other mechanisms. For example, the screw mechanism may include one or more grooves positioned on container assembly 12 near distal end 7 and/or on lid assembly 13 near container assembly 12 subsequent to coupling. The one or more grooves on container assembly 12 may be configured to contact with the one or more grooves on lid assembly 13, responsive to coupling.

Referring to FIG. 1, touchscreen 31 may be curved to match the cylindrical and/or conical shape of base assembly 11. In some implementations, touchscreen 31 may sit flush on base assembly 11. In some implementations, touchscreen 31 may include one or more of a lens, a glass top, an optical element, and/or other components. In some implementations, touchscreen 31 may be flat (i.e., level) and include a curved (topical) lens. The lens may be curved to match the cylindrical and/or conical shape of base assembly 11. The lens may be positioned on top of touchscreen 31 and/or may give the appearance that touchscreen 31 is curved. In some implementations, touchscreen 31 may protrude out from base assembly 11, such that the edge of touchscreen 31 creates a lip with base assembly 11. In some implementations, the lip of touchscreen 31 may have a height of 1 millimeters, 2 millimeters, 3 millimeters, and/or other measurements. In some implementations, the lip may surround the circumference of touchscreen 31.

Figure 4:
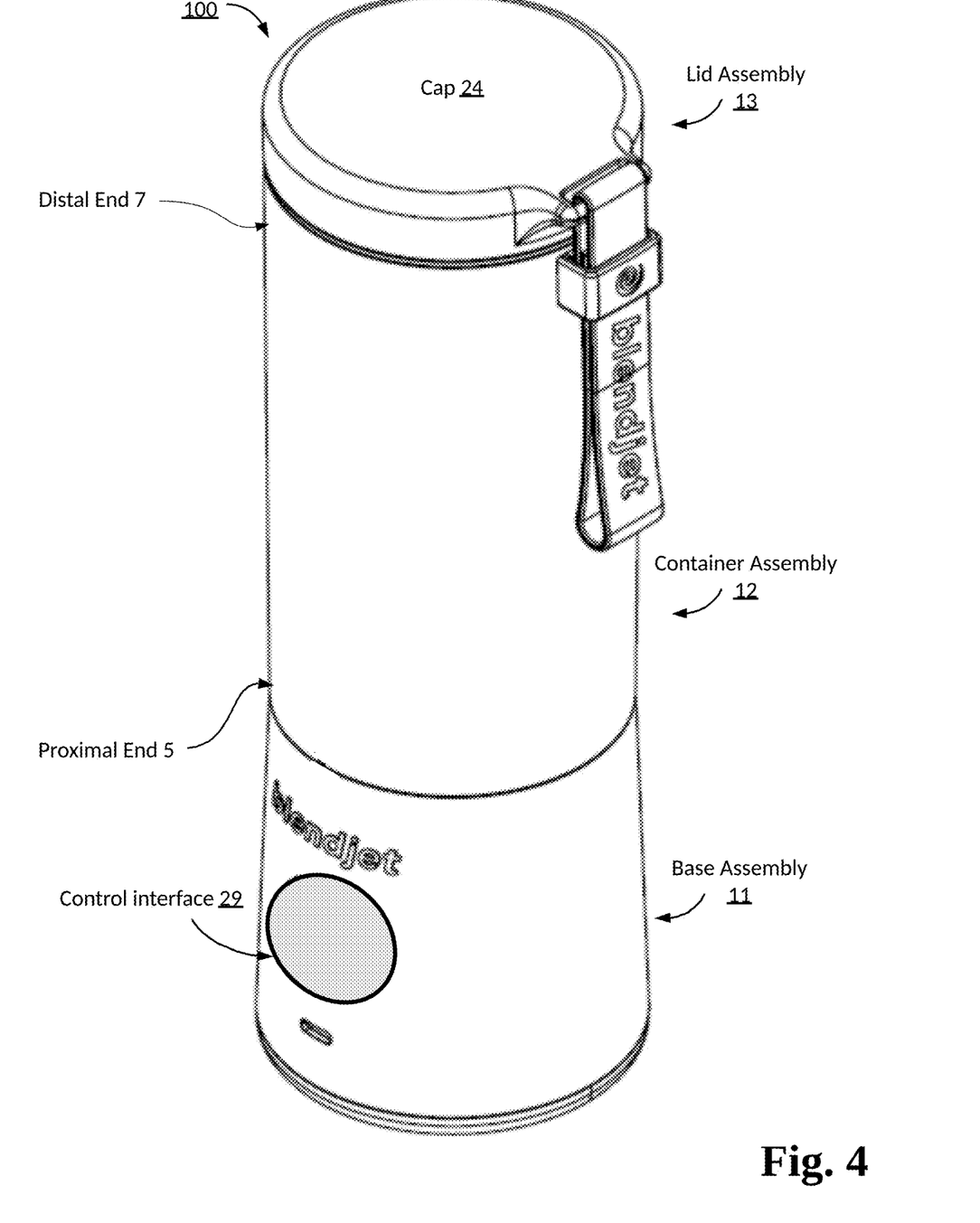
FIG. 4 shows a perspective elevated view of a blender configured to blend foodstuffs using different (blending) modes of operation, in accordance with one or more implementations.

Referring to FIG. 1, container assembly 12 may include one or more of a container body 20 and/or other components. Container body 20 may form a vessel to hold and/or contain foodstuffs within container assembly 12. In some implementations, container body 20 may be a cylindrical body and/or have a cylindrical shape, as depicted in FIG. 4. In some implementations, container body 20 may be open at one or both ends. In some implementations, container body 20 may be closed at the bottom. In some implementations, the dimensions of container assembly 12 may be such that the internal volume of container assembly 12 can hold 8, 10, 12, 14, 16, 18, 20, 22, 24, 28, 32, 36, 48, or more ounces. In some implementations, container assembly 12 and/or container body 20 may have cylindrical shapes.

Referring to FIG. 1, one or more sensors 21 may be configured to generate output signals and/or other signals. In some implementations, one or more sensors 21 may include one or more of pressure sensors, magnetic sensors, electrical sensors, digital sensors, fiber-optic sensors, presence sensors, and/or other types of sensors. The output signals may convey sensor information and/or other information pertaining to blender 100. The output signals may be received by control circuitry 17 and/or other components of blender 100. In some implementations, sensor information may indicate whether lid assembly 13 is coupled with container assembly 12. In some implementations, sensor information may indicate whether lid assembly 13 is coupled properly with container assembly 12 for leak-proof operation of blender 100. Sensor information may represent one or more lid statuses that characterize blender 100. By way of non-limiting example, the lid statuses may include a first lid status, a second lid status, a third lid status, and/or other statuses.

Referring to FIG. 1, electrical motor 14 may be configured to rotationally drive blending component 133. In some implementations, electrical motor 14 may operate at a voltage between 5V and 15V. In one or more preferential implementations, electrical motor 14 may operate at a voltage of about 7.4V. In some implementations, electrical motor 14 may be configured to spin blending component 133 at a maximum speed between 15,000 rotations per minute (RPM) and 40,000 RPM. In one or more preferential implementations, electrical motor 14 may spin blending component 133 at a maximum speed of about 22,000 RPM. Electrical motor 14 may be configured to be powered by rechargeable battery 15. Simultaneously, in some implementations, electrical motor 14 may be further configured to be powered through (standardized) charging interface 25, though that may not be the preferred way of operating blender 100. In one or more preferential implementations, no power is (or needs to be) supplied to electrical motor 14 from an external power source during blending by blender 100. In some implementations, control circuit 17 may be configured to control electrical motor 14 during rotation of blending component 133. For example, control circuit 17 may control the speed of the rotation of blending component 133 during blending by blender 100.

Referring to FIG. 1, rechargeable battery 15 may be configured to power electrical motor 14. In some implementations, rechargeable battery 15 may be configured to power electrical motor 14 such that, during blending by blender 100, no power is supplied to electrical motor 14 from an external power source. In some implementations, rechargeable battery 15 may be non-removable. As used herein, the term "non-removable" may mean not accessible to users during common usage of blender 100, including charging, blending, cleaning, and storing for later use. In some implementations, rechargeable battery 15 may be not user-replaceable (in other words, non-removable). In some implementations, rechargeable battery 15 may be user-replaceable. In some implementations, rechargeable battery 15 may be store-bought. In some implementations, rechargeable battery 15 may have a capacity between 1000 mAh and 10000 mAh. In one or more preferential implementations, rechargeable battery 15 may have a capacity of about 2500 mAh. In some implementations, control circuit 17 may be configured to control charging of rechargeable battery 15. For example, control circuit 17 may control the transfer of electrical power through standardized charging interface 25 into rechargeable battery 15. For example, responsive to a detection that rechargeable battery 15 is fully charged, control circuit 17 may prevent the transfer of electrical power through standardized charging interface 25 into rechargeable battery 15.

Charging interface 25 may be standardized and may be configured to conduct electrical power to rechargeable battery 15. In some implementations, charging interface 25 may be configured to conduct electrical power to charge rechargeable battery 15, e.g., from an external power source. In some implementations, charging interface 25 may be configured to support wireless charging of rechargeable battery 15, e.g., from an external power source, including but not limited to induction-based charging. In some implementations, charging interface 25 may be a universal serial bus (USB) port configured to receive an electrical connector for charging rechargeable battery 15. A USB port is merely one type of standardized charging interface. Other standards are contemplated within the scope of this disclosure. The electrical connector may be connected to an external power source. In some implementations, charging interface 25 may be covered for protection and/or other reasons.

Detector 18 may be configured to detect whether mechanical couplings 16 are coupled in a manner operable and suitable for blending by blender 100. In some implementations, operation of detector 18 may use one or more magnetic components. For example, in some implementations, one or more magnetic components are included in container body 20. Engagement may be detected responsive to these one or more magnetic components being aligned and sufficiently close to one or more matching magnetic components that may be included in base assembly 11. In some implementations, blender 100 may include one or more alignment indicators 19, depicted in FIG. 1 as matching triangles, to visually aid the user in aligning base assembly 11 with container assembly 12 in a manner operable and suitable for blending. In some implementations, one or more alignment indicators 19 may be in the front, in the back, and/or in other parts of blender 100.

Control interface 29 is (part of) the user interface of blender 100. Through this user interface, a user of blender 100 may control the operation of blender 100, including but not limited to transitions between different modes of operation. For example, the different modes of operation may include multiple blending modes of operation. For example, in some implementations, the modes of operation include a ready-to-blend mode. During the ready-to-blend mode, blender 100 is not (yet) blending, but blender 100 may be ready-to-blend (i.e., ready to initiate blending). For example, blender 100 may have sufficient power through rechargeable battery 15, and mechanical couplings 16 may be coupled in a manner operable and suitable for blending by blender 100, and/or the current lid status of lid assembly 13 may be suitable for initiating blending by blender 100. The transitions may include transitions from the ready-to-blend mode to one of the blending modes of operation, and/or vice versa.

In some implementations, the blending modes of operation of blender 100 may include at least two blending modes of operation: a fixed-time blending mode of operation, a variable-time blending mode of operation, and/or other blending modes of operation. For example, during the fixed-time blending mode of operation of blender 100, control circuitry 17 may be configured to effectuate rotation of blending component 133 (in other words, to effectuate blending) for a particular duration. In some implementations, the particular duration may be limited to a predetermined time limit. For example, the predetermined time limit may be 10 seconds, 20 seconds, 30 seconds, 40 seconds, 50 seconds, 1 minute, and/or other time limit. In some implementations, the predetermined time limit may be between 10 and 60 seconds, between 20 and 50 seconds, between 30 and 40 seconds, between 1 and 2 minutes, and/or have another range of durations. For example, during the variable-time blending mode of operation of blender 100, control circuitry 17 may be configured to effectuate rotation of blending component 133 for one or more durations. Individual ones of the one or more durations may correspond to individual occurrences of the user touching touchscreen 31. In other words, as long as the user continues to touch touchscreen 31, blender 100 blends. For example, the user may use short taps or longer taps, or any combination as desired during the variable time blending mode of operation of blender 100.

In some implementations, control interface 29 may include one or more touchscreens, such as touchscreen 31. For example, a touchscreen of control interface 29 may be configured to receive user input. As used herein, user input of a touchscreen may include one or more of tapping touchscreen 31, multiple consecutive occurrences of tapping on touchscreen 31, swiping touchscreen 31 (e.g., horizontally, vertically, and/or diagonally), and/or other user gestures (by way of non-limiting example, a circular swipe or gesture) or user interactions with touchscreen 31. In some implementations, control interface 29 includes exactly one touchscreen (i.e., touchscreen 31). For example, in some implementations, touchscreen 31 may be the only user-manipulatable portion of control interface 29, such that no other user interface component controls the operation of blender 100 or the transitions between different blending modes of operation used by blender 100.

In some implementations, control interface 29 may include one or more controllable light-emitting components. For example, the light-emitting components may be LEDs or other types of lights. In some implementations, the light emitting components may be positioned around the circumference of touchscreen 31. In some implementations the light emitting component may be (part of) touchscreen 31 itself. For example, touchscreen 31 may flash to indicate a transition from one (blending) mode to another (blending) mode. In some implementations, the one or more controllable light-emitting components may be configured to selectively light up. In some implementations, the one or more controllable light-emitting components may be configured to indicate, to a user, a current mode of operation of blender 100, an occurrence of a transition between different modes of operation, a warning for the user, and/or other information regarding the operation of blender 100. For example, the one or more controllable light-emitting components may use different colors, intensities, patterns, sequences, and/or other combinations of light to provide information to the user. In some implementations, control interface 29 may include one or more controllable sound-emitting components, such as a speaker, configured to selectively emit sound, such as a warning alarm. In some implementations, the one or more controllable sound-emitting components may be configured to indicate, to a user, a current mode of operation of blender 100, an occurrence of a transition between different modes of operation, a warning for the user, and/or other information regarding the operation of blender 100. For example, the one or more controllable sound-emitting components may use different frequencies, volumes, patterns, sequences, and/or other combinations of sound to provide information to the user.

In some implementations, base assembly 11 may include a haptic feedback engine (not depicted). The haptic feedback engine may be configured to provide haptic feedback to the user. Haptic feedback to the user may be controlled by control circuitry 17. In some implementations, a detection of user input by control circuitry 17 may initiate one or more haptic feedback responses by the haptic feedback engine. A haptic feedback response may include one or more vibrations of touchscreen 31. In some implementations, the haptic feedback response may be determined by the type of detections made by control circuitry 17. By way of non-limiting example, a first type of detections may initiate a first type of haptic feedback response, and a second type of detections may initiate a second type of haptic feedback response, and/or other haptic feedback responses. The first type of haptic feedback response may be different than the second type of haptic feedback response and/or other haptic feedback responses. In some implementations, haptic feedback response may vary in vibration strength, pattern, and/or other (vibration) aspects. In some implementations, the haptic feedback response may include touchscreen 31 moving inward, similar to a button, upon receiving user input. In some implementations, the haptic feedback responses may be used to convey blender information to the user. For example, a haptic feedback response may indicate to the user that blender 100 is in a low-battery mode and/or in a locked mode.

Touchscreen 31 may include on or more of an electronic ink design. In some implementations, the electronic ink design may be embedded into touchscreen 31. In some implementations, the electronic ink design may include one or more of a logo, an icon, and/or other designs. In some implementations, the electronic ink design may only be visible to the user when touchscreen 31 is not illuminated and/or turned off. In some implementations, the electronic ink design may be visible to the user when blender 100 is in one or more of a low-power mode, a locked mode, a ready-to-blend mode, a shutdown mode, and/or other modes.

In some implementations, touchscreen 31 may be configured to effectuate presentation of a settings menu, a recipe menu, a home menu, and/or other menus and/or displays to the user. The settings menu may include one or more of a first setting, a second settings, a third setting, and/or other settings. In some implementations, the one or more settings included in the settings menu may be selectable by the user (i.e., through user input). By way of non-limiting example, the first setting may be associated with effectuating notification to the user responsive to lid assembly 13 not being coupled (properly) with the container assembly 12. For example, this may be referred to as activating and/or engaging lid detection for blender 100. The second setting may be associated with preventing notifications responsive to lid assembly 13 not being coupled with the container assembly 12 and/or regardless of lid assembly 13 being coupled with container assembly 12. For example, this may be referred to as deactivating and/or disengaging lid detection for blender 100. The third setting may be associated with effectuating an overridable notification to the user responsive to lid assembly 13 not being coupled with the container assembly 12. For example, this may be referred to as activating and/or engaging overridable lid detection for blender 100.

In some implementations, touchscreen 31 may include one or more selection regions. Selection regions may include visible and invisible boundaries that divide the area of touchscreen 31 into separate selection regions. For example, touchscreen 31 may include one of more of 2 regions, 3 regions, 4 regions, 6 regions, and/or other numbers of regions. By way of non-limiting example, touchscreen 31 may be divided into 2 selection regions. In some implementations, the 2 regions may include the top half of touchscreen 31 and the bottom half of touchscreen 31. In some implementations, the 2 regions may include the left half of touchscreen 31 and the right half of touchscreen 31. In some implementations, the user touching the top half region may indicate occurrences of a particular type of detections and the user touching the bottom half region may indicate occurrences of a different particular type of detections. In some implementations, the user touching the left half region may indicate occurrences of a given type of detections and the user touching the right half region may indicate occurrences of a different type of detections. In some implementations, swiping left-to-right may be a different type of detection than swiping right-to-left. In some implementations, swiping top-to-bottom may be a different type of detection than swiping bottom-to-top.

Control circuitry 17 may be configured to control different functions and/or operations of blender 100, including but not limited to turning blender 100 on and off, transitioning between different modes of operation, charging of rechargeable battery 15, controlling of electrical motor 14 with regard to rotation of blending component 133 and/or during rotation of blending component 133, determining whether mechanical couplings 16 are engaged properly for blending, controlling or otherwise using control interface 29, and/or performing other functions for blender 100. In some implementations, control circuitry 17 may be configured to prevent rotation of blending component 133 responsive to a determination that mechanical couplings 16 are not engaged (or not engaged properly for the intended operation of blender 100), lid assembly 13 is not coupled with container assembly 12 (or not coupled properly for the intended operation of blender 100), and/or other information. In some implementations, control circuitry 17 may be configured to use control interface 29 to convey information regarding the operational status of blender 100 (e.g., notifications) to a user. In some implementations, notifications may include a warning display (e.g., a red display on touchscreen 31), an auditory warning (e.g., an alarm sound being emitted), a haptic warning (e.g., touchscreen 31 vibrating), and/or other types of notification. For example, control interface 29 may include a light that can illuminate in various colors and/or patterns. In some implementations, control circuitry 17 may be implemented as a printed circuit board (PCB).

In some implementations, control circuitry 17 may be configured to obtain the output signal generated by one or more sensor(s) 21. By way of non-limiting example, the sensor information may represent one or more of the first lid status, the second lid status, the third lid status, and/or other lid statuses representing information pertaining to blender 100. The first lid status may indicate that lid assembly 13 is coupled with container assembly 12 (i.e., the lid is on the blender, and/or properly engaged). The second lid status may indicate that lid assembly 13 is not coupled with container assembly 12 (i.e., the lid is not on the blender and/or not properly engaged). The third lid status may indicate that lid assembly 13 is partially and/or improperly (e.g., the one or more grooves on lid assembly 13 being misaligned with the one or more grooves on container assembly 12 during coupling) coupled with container assembly.

In some implementations, control circuitry 17 may be configured to make detections regarding one or more touchscreens of control interface 29. For example, control circuitry 17 may be able to detect whether touchscreen 31 has received (one or more types of) user input. User input may include one or more of the user single tapping, double tapping, swiping (horizontally from left to right, horizontally from right to left, vertically from top to bottom, vertically from bottom to top, and/or other types of swiping), tapping and holding, and/or other interactions or types of user input received through touchscreen 31. Control circuitry 17 may be configured to make different types of detections based on user input, including but not limited to first, second, and third types of detections. By way of non-limiting example, first type of detections may indicate occurrences of the user touching touchscreen 31 in a first manner and/or selecting one or more settings from the settings menu. A second type of detection may indicate occurrences of the user touching touchscreen 31 in a second manner that differs from the first manner and/or selecting one or more blending modes of operation. A third type of detection may indicate occurrences of the user touching touchscreen 31 in a third manner that differs from the first manner and the second manner and/or overriding a notification or warning being presented to the user, and so forth.

In some implementations, control circuitry 17 may be configured to control operations of control interface 29 to enable one of more transitions between different (blending) modes of operation and/or effectuate presentation of one or more notifications to the user. In some implementations, a first transition may occur responsive to a first detection of the first type of detections occurring, a second detection of the second type of detections occurring, and the sensor information representing the first lid status (i.e., lid assembly 13 being coupled with container assembly 12). The first detection may indicate that the user has selected the first blending mode of operation (or, initiated blending) and the second detection may indicate that the user has selected the first setting (i.e., associated with effectuating presentation of one or more notifications responsive to lid assembly 13 not being coupled with container assembly 12) from the settings menu. The first transition may be from the ready-to-blend mode to the first blending mode. The first blending mode may be one of a fixed-time blending mode, a variable time blending mode, and/or other blending modes. For example, the second transition may be from a first blending mode to a ready-to-blend mode. In some implementations, responsive to the first detection of the first type of detections occurring, the second detection of the second type of detections occurring, and the sensor information representing the second lid status (i.e., lid assembly 13 not being coupled with container assembly 12), the first transition may be prevented and/or a notification may be presented to the user. The notification may include a visual warning (e.g., on control interface 29 and/or touchscreen 31), an auditory warning, a haptic warning, and/or other types of warnings that may indicate to the user that lid assembly 13 is not coupled with container assembly 12. In some implementations, responsive to the first detection of the first type of detections occurring, and further responsive to the second detection of the second type of detections occurring, and the sensor information representing the third lid status (i.e., lid assembly 13 being partially and/or improperly coupled with the container assembly), the first transition may be prevented and/or a notification may be presented to the user.

In some implementations, responsive to the first detection of the first type of detections occurring and a third detection of the second type of detections occurring, a second transition may occur regardless of the sensor information. The third detection of the second type of detections may indicate the user selecting the second setting (i.e., associated with preventing notifications from being presented) from the settings menu. The second transition may be from the ready-to-blend mode to the first blending mode.

In some implementations, responsive to the first detection of the first type of detections occurring, a fourth detection of the second type of detections occurring, and the sensor information representing the first lid status (i.e., lid assembly 13 is coupled with container assembly 12), a third transition may occur. The fourth detection of the second type of detections may indicate that the user selecting the third setting (i.e., associated with effectuating presentation of one or more overridable notifications responsive to lid assembly 13 not being coupled with container assembly 12) from the settings menu. The third transition may be from the ready-to-blend mode to the first blending mode.

In some implementations, responsive to the first detection of the first type of detections occurring, the fourth detection of the second type of detections occurring, and the sensor information representing the second or third lid status, transition from the ready-to-blend mode to the first blending mode may be prevented and/or an overridable notification may be presented to the user. The overridable notification may include one or more of a visual warning (on touchscreen 31), an auditory warning, a haptic warning, and/or other types of warnings that may indicate to the user that lid assembly 13 is not coupled with container assembly 12. In some implementations, the overridable notification may be capable of being dismissed through specific user input received by control interface 29. The specific user input may be received by control interface 29 during presentation of the overridable notification. In some implementations, the specific user input may include a long press, a triple tap, tapping a "Dismiss" button presented on touchscreen 31, and/or other types of gestures during presentation of the overridable notification. Responsive to the specific user input, control circuitry 17 may prevent presentation of the overridable notification and/or a fourth transition may occur from the ready-to-blend mode to the first blending mode. In some implementations, control circuitry 17 may be configured to allow rotation of blending component 133 in an unlocked mode of operation (by way of non-limiting example, the ready-to-blend mode may be an unlocked mode of operation).

In some implementations, control circuitry 17 may be configured to control operations of control interface 29 to enable the user to make modifications to one or more aspects of one or more blending modes of operation. Aspects of one of more blending modes of operations may include one of more of (default) time duration, blending strength, blending speed, number of rotations of the blending component, blending direction, and/or other features of the blending mode. In some implementations, modifications to one or more aspects of one of more blending modes of operation may occur responsive to an occurrence of the third type of detections. By way of non-limiting example, modifications may occur after a transition from a first display to a settings menu display. In some implementations, the transition from the first display to the settings menu display may occur responsive to an occurrence of the second type of detections. Modifications may occur responsive to an occurrence of the third type of detections. In some implementations, the third type of detections may include single tapping, double tapping, swiping, tapping and holding, and/or other interactions with touchscreen 31. In some implementations, the settings menu may appear on touchscreen 31 as a dial. The dial may include one or more indicators and/or one or more time durations corresponding to one or more blending modes of operation. The user may mimic spinning and/or otherwise rotating the displayed dial as a form or type of user input. The user may swipe touchscreen 31 to initiate an occurrence of the third type of detections. The occurrence of certain types of detections may cause the dial to turn and the indicator to indicate a different time duration than the initial time duration, and, subsequently, may set the new time duration to the pertinent blending mode of operation.

In some implementations, control by a user of blender 100 may be based on a switch (not shown), a button (not shown), voice-controlled operation (not shown), touch-free gesture-based operation (not shown), and/or other types of user interfaces suitable to control or turn consumer appliances on and off. Control interface 29 (e.g., through one or more light-emitting components) may be configured to illuminate in various colors (red, blue, purple, etc.) and/or patterns (solid, fast blinking, slow blinking, alternating red and blue, etc.). Control interface 29 may convey information regarding the operational status of blender 100 to a user. The operational status of blender 100 may be determined by control circuitry 17. Control interface 29 may be controlled by control circuitry 17. For example, if control interface 29 is solid purple, blender 100 may be charging and/or insufficiently charged to blend. For example, if control interface 29 is solid blue, blender 100 may be ready for blending (e.g., in the ready-to-blend mode). For example, if control interface 29 is alternating red and blue, blender 100 may not be ready for blending due to base assembly 11 and container assembly 12 not being coupled properly and/or fully. For example, in some implementations, threaded couplings between assembly 11 and container assembly 12 may need to be tightened sufficiently for proper blending, and control interface 29 may warn the user if needed.

Figure 3A:
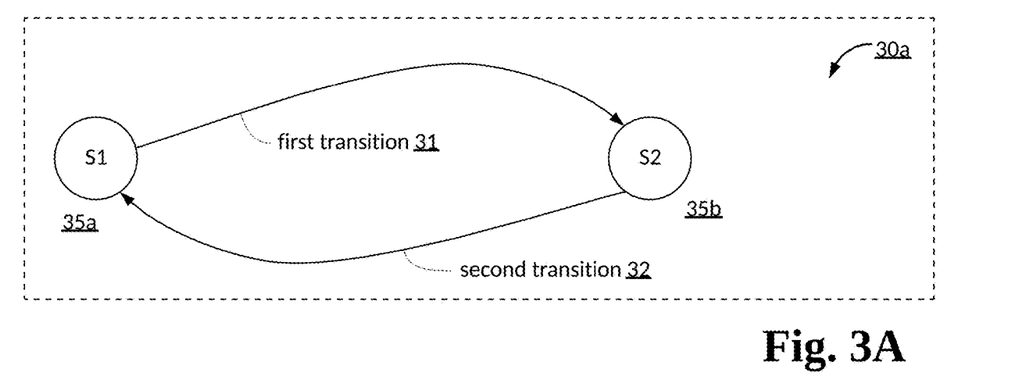
FIGS. 3A-3B-3C illustrate state transitions in exemplary state diagrams as may be used by a blender configured to blend foodstuffs using different (blending) modes of operation, in accordance with one or more implementations.

By way of non-limiting example, FIG. 3A illustrates state transitions in a state diagram 30a as may be used by blender 100, e.g., responsive to different types of detections regarding control interface 29 being manipulated by a user as described elsewhere in this disclosure. As depicted, state diagram 30a may include a first state 35a (labeled "S1") and a second state 35b (labeled "S2"). First state 35a may correspond to a ready-to-blend mode of blender 100. Second state 35b may correspond to a first blending mode of operation of blender 100. As depicted here, a first transition 31 may transition the mode of operation of blender 100 from first state 35a to second state 35b. A second transition 32 may transition the mode of operation of blender 100 from second state 35b to first state 35a. First transition 31 may occur responsive to detection of the first type of detections. In some implementations, first transition 31 may be prevented if the settings reflect that lid detection is active, and the lid status reflects that lid assembly 13 is not closed properly. Second transition 32 may occur automatically, e.g., after completion of a first blending operation.

Figure 3B:
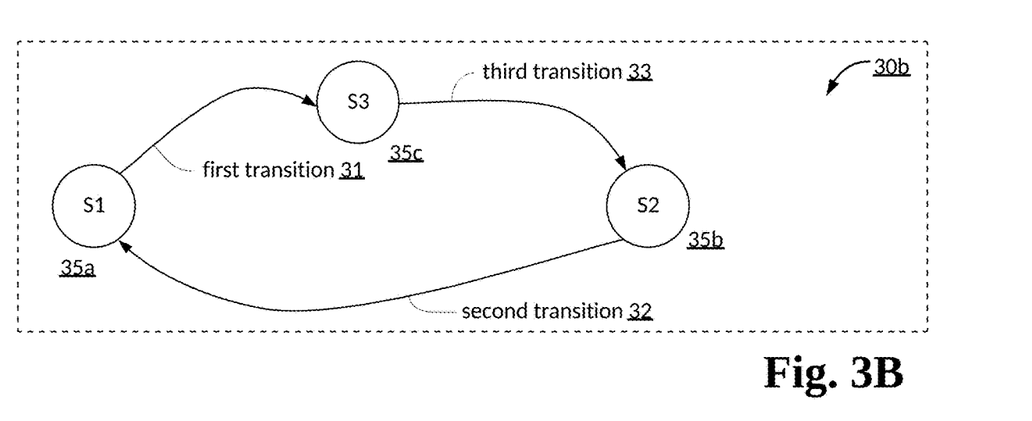

By way of non-limiting example, FIG. 3B illustrates state transitions in a state diagram 30b as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may be similar as described regarding FIG. 3A. Second state 35b may correspond to a first blending mode of operation of blender 100. Third state 35c may correspond to a second and/or intermediate mode of operation of blender 100. As depicted in state diagram 30b, a first transition 31 may transition the mode of operation of blender 100 from first state 35a to third state 35c. A second transition 32 may transition the mode of operation of blender 100 from second state 35b to first state 35a. A third transition 33 may transition the mode of operation of blender 100 from third state 35c to second state 35b. First transition 31 may occur responsive to detection of the first type of detections. Third transition 33 may occur responsive to completion of operations during third state 35c. In some implementations, third transition 33 may occur regardless of the lid status, responsive to a user selecting to ignore detections that lid assembly 13 is not closed properly. Second transition 32 may occur automatically.

Figure 3C:
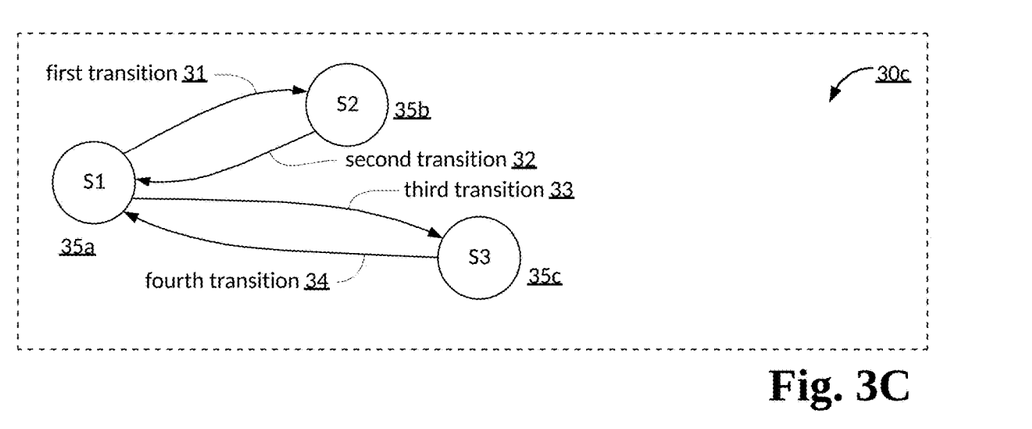

By way of non-limiting example, FIG. 3C illustrates state transitions in a state diagram 30c as may be used by blender 100, e.g., responsive to different types of detections regarding control interface 29 being manipulated by a user as described elsewhere in this disclosure. As depicted, state diagram 30b may include a first state 35a (labeled "S1"), a second state 35b (labeled "S2"), and a third state 35c (labeled "S3"). First state 35a may be similar as described regarding FIG. 3B. Second state 35b may correspond to a first blending mode of operation of blender 100. Third state 35c may correspond to a second blending mode of operation of blender 100. As depicted in state diagram 30b, a first transition 31 may transition the mode of operation of blender 100 from first state 35a to second state 35b. A second transition 32 may transition the mode of operation of blender 100 from second state 35b back to first state 35a. In some implementations, second state 35b may reflect that lid detection is activated in the settings, and the lid status reflects that lid assembly 13 is not closed properly, yet the user attempts to initiate blending. Accordingly, a notification or warning may be provided to the user. A third transition 33 may transition the mode of operation of blender 100 from first state 35a to third state 35c. A fourth transition 34 may transition the mode of operation of blender 100 from third state 35c back to first state 35a. In some implementations, third state 35c may reflect that notifications and/or warnings regarding lid status are overridable by the user (as controlled through specific settings), and that the user has engaged with blender 100 (e.g., with touchscreen 31) in a manner that overrides such notifications and/or warnings. Accordingly, blending may be initiated as initiated by the user. In other words, blending will be no longer prevented responsive to the user overriding such notifications and/or warnings. First transition 31 may occur responsive to a first detection of the first type of detections. Second transition 32 may occur responsive to a second detection of the first type of detections (or automatically). Third transition 33 may occur responsive to a third detection of a particular type (e.g., the first type) of detections. Fourth transition 34 may occur responsive to a fourth detection of a particular type (e.g., the first type) of detections, or automatically.

Figure 2:
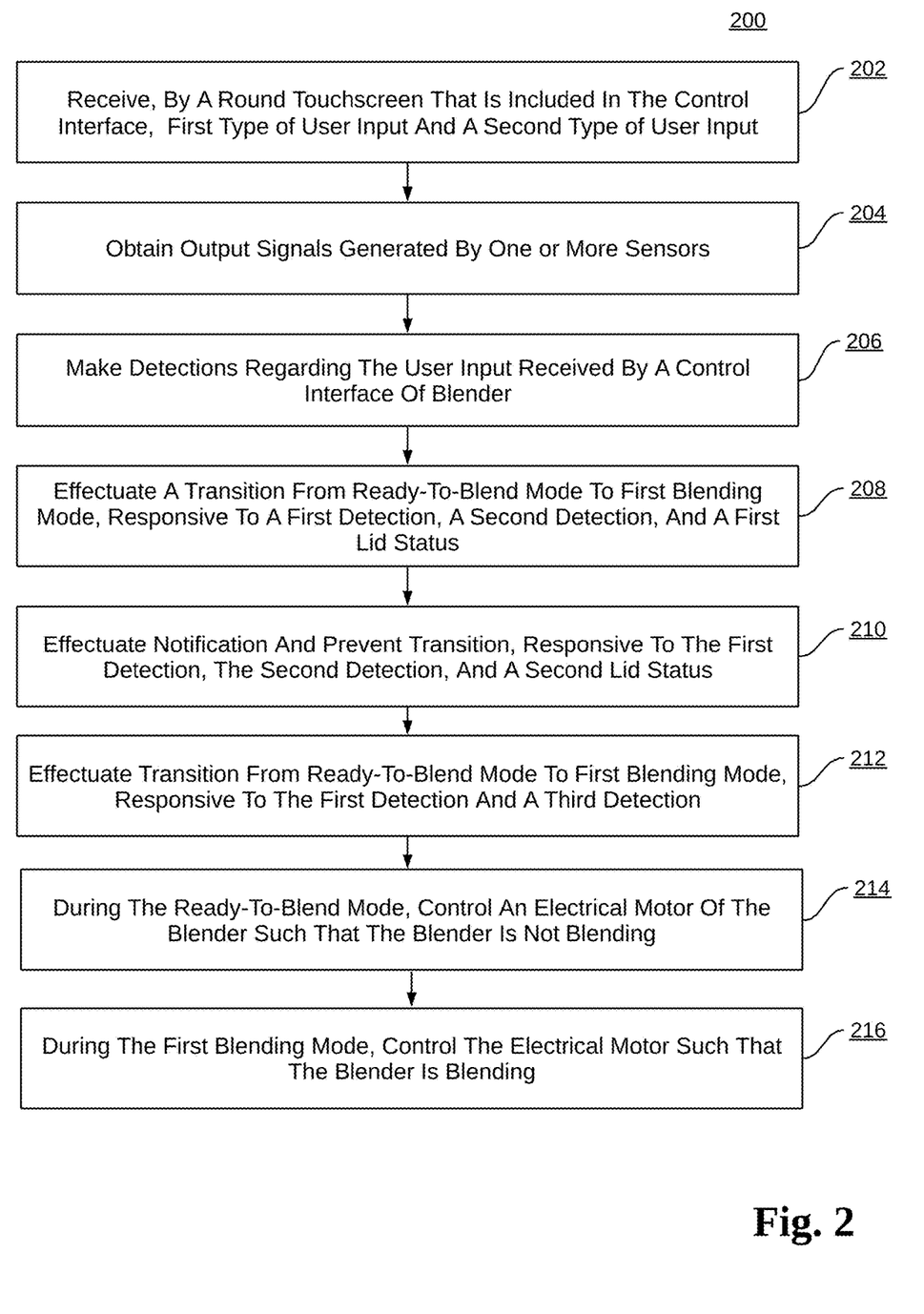
FIG. 2 shows a method for transitioning from a ready-to-blend mode to a first blending mode, in accordance with one or more implementations.

FIG. 2 illustrates a method 200 for transitioning between a ready-to-blend mode and a first blending mode, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving, by a (round) touchscreen that is included in the control interface of the blender, a first type of user input and a second type of user input. The first type of user input may indicate a user touching the touchscreen in a first manner and the second type of user input may indicate the user touching the touchscreen in a second manner, different from the first manner. In some embodiments, operation 202 is performed by a touchscreen the same as or similar to touchscreen 31 (shown in FIG. 1 and described herein).

An operation 204 may include obtaining output signals generated by the one or more sensors. The output signals may include sensor information representing at least one of a first lid status, a second lid status, and/or other statuses. The first lid status may indicate that the lid assembly is coupled with the container assembly, and the second lid status may indicate that the lid assembly is not coupled with the container assembly. In some embodiments, operation 204 is performed by control circuitry the same as or similar to control circuitry 17 (shown in FIG. 1 and described herein).

An operation 206 may include making detections regarding the user input received by the control interface of the blender. The detections may include a first type of detections, a second type of detections, and/or other types of detections. The first type of detections may indicate occurrences of the control interface receiving the first type of user input. The first type of user input may indicate the user selecting the first blending mode. The second type of detections may indicate occurrences of the control interface receiving the second type of user input. The second type of user input may indicate the user selecting the first setting or the second setting from a settings menu. In some embodiments, operation 206 is performed by control circuitry the same as or similar to control circuitry 17 (shown in FIG. 1 and described herein).

An operation 208 may include effectuating a transition from the ready-to-blend mode to the first blending mode, responsive to a first detection of the first type of detections occurring, a second detection of the second type of detections occurring, and the sensor information representing the first lid status. The second detection may indicate the user has selected the first setting from the settings menu. In some embodiments, operation 208 is performed by control circuitry the same as or similar to control circuitry 17 (shown in FIG. 1 and described herein).

An operation 210 may include effectuating the notification to the user via the touchscreen and preventing transition from the ready-to-blend mode to the first blending mode, responsive to the first detection of the first type of detections occurring, the second detection of the second type of detections occurring, and the sensor information representing the second lid status. In some embodiments, operation 210 is performed by control circuitry the same as or similar to control circuitry 17 (shown in FIG. 1 and described herein).

An operation 212 may include effectuating a transition from the ready-to-blend mode to the first blending mode regardless of the sensor information, responsive to the first detection of the first type of detections and a third detection of the second type of detections. The third detection may indicate the user has selected the second setting from the settings menu. In some embodiments, operation 212 is performed by control circuitry the same as or similar to control circuitry 17 (shown in FIG. 1 and described herein).

An operation 214 may include, during the ready-to-blend mode, controlling an electrical motor such that the blender is not blending. The electrical motor may be included in the base assembly of the blender. In some embodiments, operation 214 is performed by control circuitry the same as or similar to control circuitry 17 (shown in FIG. 1 and described herein).

An operation 216 may include, during the first blending mode, controlling an electrical motor such that the blender is blending. In some embodiments, operation 216 is performed by control circuitry the same as or similar to control circuitry 17 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A blender configured to blend foodstuffs using different blending modes of operation, wherein the different blending modes of operation include a ready-to-blend mode and a first blending mode, wherein the blender is not blending during the ready-to-blend mode, and wherein mode the blender is blending during the first blending mode, the blender comprising:
 a base assembly, a container assembly, a lid assembly, a blending component, a control interface, control circuitry, and one or more sensors,
 wherein the base assembly includes:
  an electrical motor configured to drive rotation of the blending component, wherein the electrical motor is integrated into the base assembly;
  a rechargeable battery configured to power the electrical motor; and
  a standardized charging interface configured to conduct electrical power to the rechargeable battery;
 wherein the blending component is configured to rotate around a rotational axis and blend the foodstuffs during blending by the blender,
 wherein the container assembly is configured to hold the foodstuffs within a container body during blending by the blender, wherein the container assembly includes a proximal end and a distal end opposite the proximal end;
 wherein the lid assembly is configured to couple with the container assembly, near the distal end of the container assembly;
 wherein the one or more sensors are configured to generate output signals conveying sensor information, the sensor information indicating whether the lid assembly is coupled with the container assembly,
 wherein the control interface is configured to:
  effectuate presentation of a settings menu to the user, wherein the settings menu includes a first setting and a second setting, wherein the first setting and the second setting are selectable by the user, wherein selection of the first setting is associated with effectuating a notification to the user responsive to the lid assembly not being coupled with the container assembly, and wherein the selection of the second setting is associated with preventing notifications responsive to the lid assembly not being coupled with the container assembly;
  receive a first type of user input and a second type of user input, wherein the first type of user input indicates the user using the control interface in a first manner and the second type of user input indicates the user using the control interface in a second manner;
 wherein the control circuitry is included in the base assembly and configured to:
  control the electrical motor during the rotation of the blending component during at least the first blending mode;
  obtain the output signals generated by the one or more sensors, wherein the sensor information represents at least one of a first lid status and a second lid status, wherein the first lid status indicates that the lid assembly is coupled with the container assembly, and wherein the second lid status indicates that the lid assembly is not coupled with the container assembly;
  make detections regarding the user input received by the control interface, wherein the detections include a first type of detections and a second type of detections, wherein the first type of detections indicates occurrences of the control interface receiving the first type of user input, wherein the first type of user input indicates the user selecting the first blending mode, wherein the second type of detections indicate occurrences of the control interface receiving the second type of user input, and wherein the second type of user input indicates the user selecting the first setting or the second setting from the settings menu;
  responsive to a first detection of the first type of detections occurring and a second detection of the second type of detections occurring, wherein the second detection indicates the user has selected the first setting from the settings menu:
   (i) further responsive to the sensor information representing the first lid status, effectuate a transition from the ready-to-blend mode to the first blending mode;
   (ii) further responsive to the sensor information representing the second lid status, effectuate the notification to the user via the control interface and prevent transition from the ready-to-blend mode to the first blending mode.

2. The blender of claim 1, wherein the control circuitry is further configured to:
 responsive to the first detection of the first type of detections and a third detection of the second type of detections, wherein the third detection indicates the user has selected the second setting from the settings menu, effectuate a transition from the ready-to-blend mode to the first blending mode regardless of the sensor information.

3. The blender of claim 1, wherein the sensor information includes a third lid status, wherein the third lid status indicates the lid assembly is partially coupled with the container assembly, wherein the control circuitry is further configured to:
 responsive to the first detection of the first type of detections, the second detection of the second type of detections, and the sensor information representing the third lid status, prevent transition from the ready-to-blend mode to the first blending mode.

4. The blender of claim 1, wherein the notification is at least one of a warning display, an auditory warning, or a haptic warning, wherein the control interface includes a touchscreen, and wherein the user input includes at least one of:
 (i) tapping the touchscreen once,
 (ii) multiple consecutive occurrences of tapping the touchscreen, and
 (iii) swiping the touchscreen.

5. The blender of claim 1, wherein the one or more sensors are positioned on at least one of the lid assembly, the container assembly, and the base assembly.

6. The blender of claim 5, wherein the one or more sensors positioned on the container assembly are configured to contact with the base assembly, subsequent to the base assembly being coupled to the container assembly, near the blending component.

7. The blender of claim 1, wherein the proximal end of the container assembly is closed and configured to couple with the blending component, such that the electrical motor drive rotation of the blending component responsive to the container assembly being coupled with the base assembly and the blending component being coupled with the container assembly.

8. The blender of claim 1, wherein the proximal end of the container assembly is open and disposed, subsequent to the container assembly not being coupled with the base assembly, and wherein the blending component is mounted to the base assembly.

9. The blender of claim 1, wherein the settings menu includes a third setting that is selectable by the user, wherein the third setting is associated with presenting the user with an overridable notification, responsive to the lid assembly not being coupled with the container assembly, and wherein the overridable notification may be dismissed by specific user input to the control interface during presentation of the overridable notification.

10. The blender of claim 9, wherein, responsive to the overridable notification being dismissed by the specific user input, the control circuitry is configured to effectuate transition from the ready-to-blend mode to the first blending mode.

11. A method for transitioning between a ready-to-blend mode and a first blending mode of a blender, the blender being configured to blend foodstuffs, wherein the blender includes a base assembly, a container assembly, a lid assembly, a blending component, a control interface, control circuitry, and one or more sensors the method comprising:
effectuating presentation of a settings menu to the user by the control interface, wherein the settings menu includes a first setting and a second setting, wherein the first setting and the second setting are selectable by the user, wherein selection of the first setting is associated with effectuating a notification to the user responsive to the lid assembly not being coupled with the container assembly, and wherein the selection of the second setting is associated with preventing notifications responsive to the lid assembly not being coupled with the container assembly;
receiving, by the control interface of the blender, a first type of user input and a second type of user input, wherein the first type of user input indicates the user using the control interface in a first manner and the second type of user input indicates the user using the control interface in a second manner;
obtaining output signals generated by the one or more sensors, wherein the output signals include sensor information representing at least one of a first lid status and a second lid status, wherein the first lid status indicates that the lid assembly is coupled with the container assembly, and wherein the second lid status indicates that the lid assembly is not coupled with the container assembly;
making detections regarding the user input received by the control interface, wherein the detections include a first type of detections and a second type of detections, wherein the first type of detections indicates occurrences of the control interface receiving the first type of user input, wherein the first type of user input indicates the user selecting the first blending mode, wherein the second type of detections indicate occurrences of the control interface receiving the second type of user input, and wherein the second type of user input indicates the user selecting the first setting or the second setting from the settings menu;
responsive to a first detection of the first type of detections occurring and a second detection of the second type of detections occurring, wherein the second detection indicates the user has selected the first setting or the second setting from the settings menu:
(i) further responsive to the sensor information representing the first lid status, effectuating a transition from the ready-to-blend mode to the first blending mode;
(ii) further responsive to the sensor information representing the second lid status, effectuating the notification to the user via the control interface and preventing transition from the ready-to-blend mode to the first blending mode;
during the ready-to-blend mode, controlling an electrical motor included in the base assembly of the blender such that the blender is not blending; and
during the first blending mode, controlling the electrical motor of the bender such that the blender is blending unless prevented due to the sensor information representing the second lid status.

12. The method of claim 11, further comprising:
responsive to the first detection of the first type of detections and a third detection of the second type of detections, wherein the third detection indicates the user has selected the second setting from the settings menu, effectuating a transition from the ready-to-blend mode to the first blending mode regardless of the sensor information.

13. The method of claim 11, wherein the sensor information includes a third lid status, wherein the third lid status indicates the lid assembly is partially coupled with the container assembly, wherein the method further includes:
responsive to the first detection of the first type of detections, the second detection of the second type of detections, and the sensor information representing the third lid status, preventing transition from the ready-to-blend mode to the first blending mode.

14. The method of claim 11, wherein the notification is at least one of a warning display, an auditory warning, or a haptic warning, wherein the control interface includes a touchscreen, and wherein the user input includes at least one of:
(i) tapping the touchscreen once,
(ii) multiple consecutive occurrences of tapping the touchscreen, and
(iii) swiping the touchscreen.

15. The method of claim 11, wherein the one or more sensors are positioned on at least one of the lid assembly, the container assembly, and the base assembly.

16. The method of claim 15, wherein the one or more sensors positioned on the container assembly are configured to contact with the base assembly, subsequent to the base assembly being coupled to the container assembly, near the blending component.

17. The method of claim 11, wherein the proximal end of the container assembly is closed and configured to couple with the blending component, such that the electrical motor drive rotation of the blending component responsive to the container assembly being coupled with the base assembly and the blending component being coupled with the container assembly.

18. The method of claim 11, wherein the proximal end of the container assembly is open and disposed, subsequent to the container assembly not being coupled with the base assembly, and wherein the blending component is mounted to the base assembly.

19. The method of claim 11, wherein the settings menu includes a third setting that is selectable by the user, wherein the third setting is associated with presenting the user with an overridable notification, responsive to the lid assembly not being coupled with the container assembly, and wherein the overridable notification may be dismissed by specific user input to the control interface during presentation of the overridable notification.

20. The method of claim 19, wherein, responsive to the overridable notification being dismissed by the specific user input, the control circuitry is configured to effectuate transition from the ready-to-blend mode to the first blending mode.

* * * * *